United States Patent [19]

Lundin et al.

[11] Patent Number: 4,642,494
[45] Date of Patent: Feb. 10, 1987

[54] MEANS TO IMPROVE PERFORMANCE OF ELECTRIC MOTORS

[75] Inventors: Robert S. Lundin, Northfield; Demetris Petritis, New Britain, both of Conn.

[73] Assignee: The Superior Electric Company, Bristol, Conn.

[21] Appl. No.: 782,932

[22] Filed: Oct. 2, 1985

[51] Int. Cl.$^4$ .................................. H02K 19/12
[52] U.S. Cl. ................................. 310/49 R; 310/162
[58] Field of Search .............. 310/49 R, 156, 162, 310/186, 190, 254; 318/696

[56] References Cited

U.S. PATENT DOCUMENTS 3,978,356 8/1976 Spiesberger .................. 310/162
4,031,419 6/1977 Spiesberger et al. .......... 310/186

OTHER PUBLICATIONS

Say, M. G., *Alternating Current Machines*, 5th Ed., Wiley, NY 1983, pp. 190-193.

*Primary Examiner*—Patrick R. Salce
*Assistant Examiner*—D. L. Rebsch
*Attorney, Agent, or Firm*—John H. Crozier

[57] ABSTRACT

An electric motor having a rotor and a stator with two sets of stator poles. The poles of one set of stator poles are disposed in positions about the stator which they would normally occupy if all stator poles were disposed symmetrically about the rotor. The poles of the other set are displaced from their normal positions by an angle. The angle is chosen so that a subharmonic of the fundamental torque/angle curve is substantially reduced, thus improving the performance of several types of motors.

5 Claims, 7 Drawing Figures

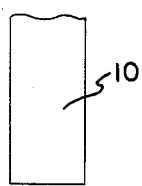
FIG. 4
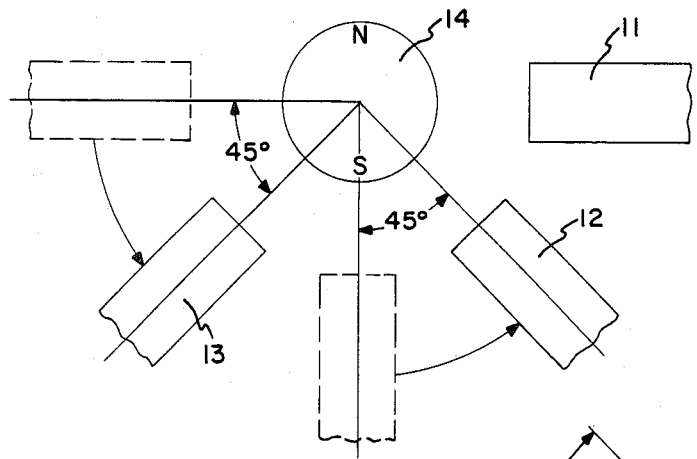
FIG. 5
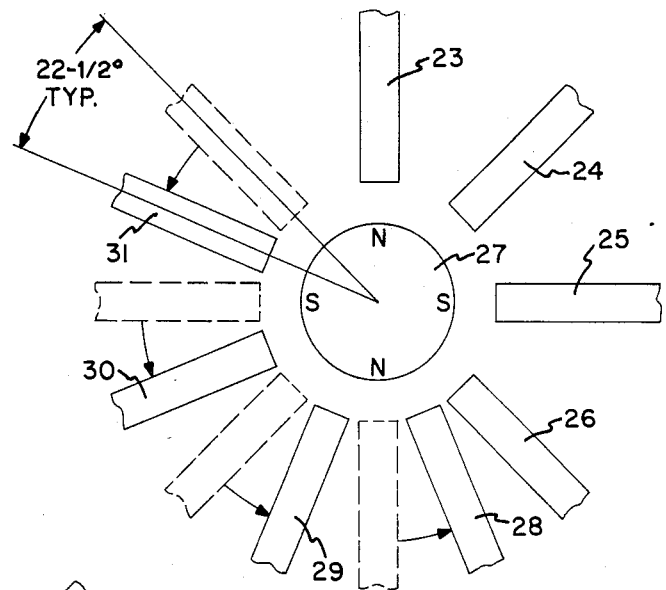
FIG. 6
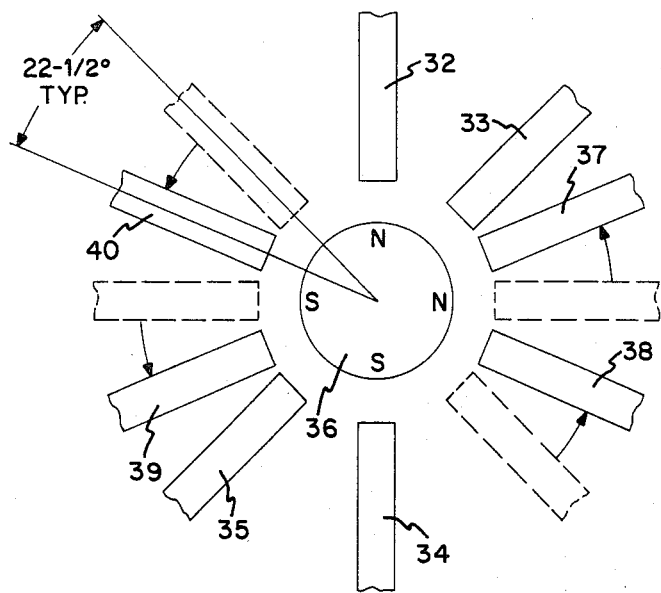

MEANS TO IMPROVE PERFORMANCE OF ELECTRIC MOTORS

BACKGROUND OF THE INVENTION

1. Technical Field

This invention relates to electric motors, and more particularly to an improved design for rotary brushless DC, stepping, and synchronous inductor motors which reduces a given harmonic of the fundamental (torque)/(displacement angle of the rotor) relationship.

2. Background Art

Rotary brushless DC, stepping, and synchronous inductor motors are well known in the art. Each type includes a rotor and a stator, with the stator having a plurality of salient poles energized by the passage of electric current through coils wound upon the poles. The coils are so arranged as to provide at least two electrical phases. The rotor includes at least one pair of N-S magnetic poles which are flux-linked with the stator poles, so that successive energizations of the phases provide rotary motion of the rotor.

The (torque)/(displacement angle of the rotor) relationship, "torque/angle curve", between a rotor pole and each of the stator poles, may be expressed in general by the well known Fourier expansion:

$$T = k\ [1 + A_1\cos\theta_e + A_2\cos 2\theta_e \ldots A_n\cos\theta_e + B_1\sin\theta_e + B_2\sin]$$

where

T = torque,
k = a constant,
$A_1, A_2 \ldots An$ = Fourier Coefficients (constants) of the cosine terms
$B_1, B_2 \ldots Bn$ = Fourier Coefficients (constants) of the sine terms
$\theta_e$ = the displacement of the rotor in electrical degrees.

In the equation, $A_1\cos\theta_e + B_1\sin\theta_e$ represents the fundamental (first) harmonic produced as the rotor poles pass the stator poles; $A_2\cos 2\theta_e + B_2\sin 2\theta_e$ is the second harmonic of the fundamental; and so forth.

In the special case in which $\theta$ is defined as the rotor position for which the centerline of the rotor pole coincides with the centerline of the stator pole for which the Fourier expansion is being written, the expansion is greatly simplified to It is well known that the presence of torque/angle harmonics is especially detrimental to the performance of synchronous inductor motors, step motors, and brushless D.C. motors. In particular, a harmonic of the order corresponding to twice the number of phases (e.g. 4th harmonic for a 2-phase machine, 6th harmonic for a 3-phase machine, etc.) is particularly detrimental because of its dominance in the distribution of harmonic content. This particular harmonic is responsible for "detent torque", an objectionable resistance to rotation of the rotor of a de-energized motor. Step accuracy of a step motor, velocity modulation of synchronous inductor motors, step motors, and brushless D.C. motors, and microstepping ability of step motors and brushless D.C. motors are all adversely affected by torque/angle harmonics, and particularly by the one responsible for detent torque as described above.

It would be advantageous in such motors to be able to minimize the dominant harmonic which adversely affects motor performance as described above.

In U.S. Pat. No. 4,516,048, assigned to the assignee of the present application, there is disclosed means for minimizing a given harmonic of the torque/angle curve of motors by providing a stator with toothed poles, the teeth on the poles being set at a nonuniform pitch according to a specified relationship. While that arrangement satisfactorily reduces the harmonic, the stator poles of synchronous inductor motors, step motors, and brushless D.C. motors having a large angle of incremental motion, are commonly untoothed, precluding the use of the teaching embodied in U.S. Pat. No. 4,516,048.

SUMMARY OF THE INVENTION

The present invention provides for minimization of a given harmonic of the torque/angle curve by providing a motor having first and second rotor/stator combinations, the two combinations being so arranged that, although each produces the harmonic to be minimized, the harmonic produced by one cancels the harmonic produced by the other. This result is achieved by displacing a first set of stator poles from a second set of stator poles.

Thus, with the appropriate harmonic substantially reduced, the adverse effect on performance in brushless DC, stepping, and synchronous inductor motors due to the presence of that harmonic can be reduced, and performance in brushless DC and stepping motors can be improved.

BRIEF DESCRIPTION OF THE DRAWING

FIGS. 4 through 6 show embodiments of the present invention.

DETAILED DESCRIPTION OF THE PREFERRED EMBODIMENT

Figure 1:
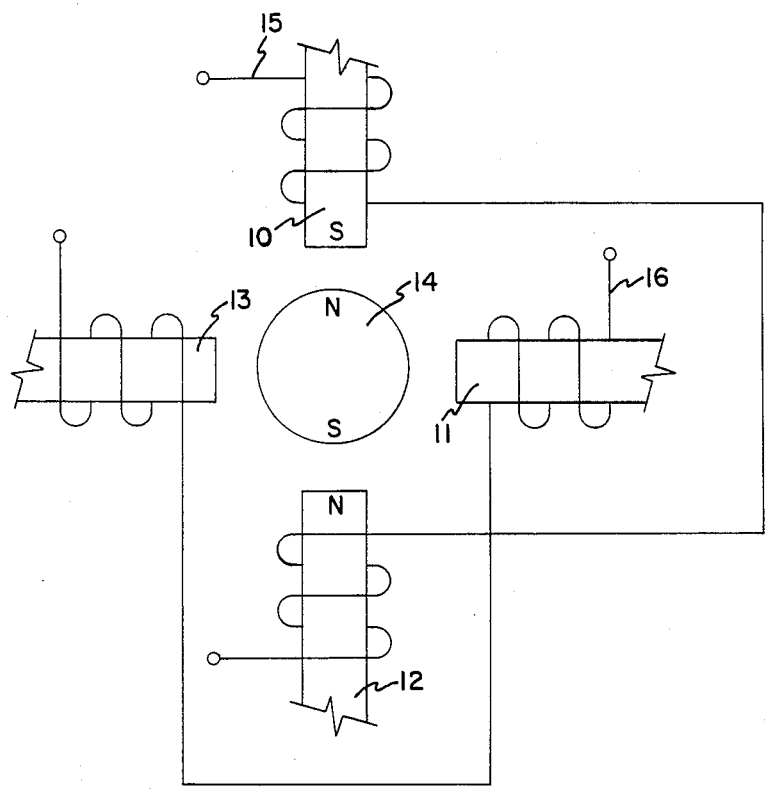
FIG. 1 is a schematic of a conventionally constructed motor.

FIG. 1 shows diagrammatically in cross section a portion of a two-phase, four-pole-stator, conventionally constructed motor, which may be one of the three types discussed above, having stator poles 10, 11, 12, and 13, and a rotor 14. The rotor has one pair of nonsalient N-S magnetic poles radially displaced 180° mechanical and the stator poles 10, 11, 12, and 13 are radially disposed about the rotor 14 at equal intervals of 90° mechanical, as shown. With the position of the rotor 14 shown, it may be assumed that a winding 15 serially would upon poles 10 and 12, comprising one phase, is energized to produce the polarities indicated on those poles. To produce clockwise rotation of the rotor 14, a winding 16 serially wound upon poles 11 and 13, comprising a second phase, would be energized to give pole 11 a south magnetic polarity and pole 13 a north magnetic polarity. In this state, the rotor would rotate 45 degrees electrical so that its north pole would be located midway between stator poles 10 and 11, and its south pole located midway between stator poles 12 and 13. Subsequently, winding 15 would be deenergized and the rotor would rotate another 45 degrees electrical so that its north pole would be in alignment with stator pole 11, and its south pole in alignment with stator pole 13. Successive alternate energizations of the windings (observing appropriate polarities) in the same pattern would produce continued clockwise rotation of the rotor 14. It is understood that the portion of the switching cycle in which both phases are energized may be omitted, in which case the rotor's motion increment would be 90 degrees electrical.

While, as shown, the stator poles 10, 11, 12, and 13 are untoothed and the poles on the rotor 14 are nonsalient, it will be understood that the invention hereinafter described may be applied as well to a motor having toothed stator poles and salient rotor poles or a combination of configurations, as the type and design parameters of the particular motor may dictate.

Figure 2:
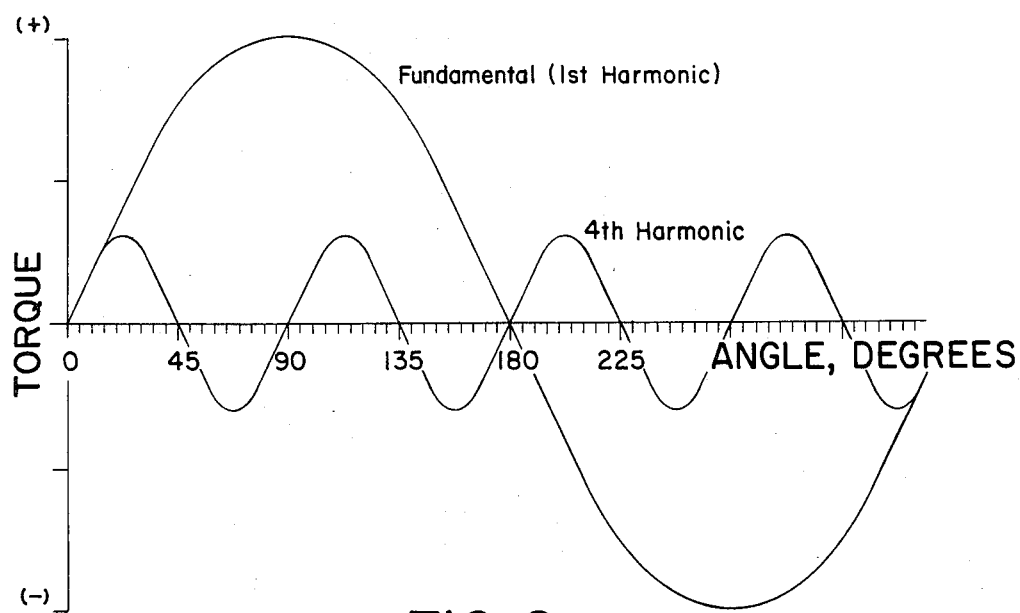
FIG. 2 shows the torque/angle curve for a conventional motor.

The fumdamental torque/angle curve of each pole of the motor of FIG. 1 is given by $T = K[B_1 \sin \theta_e + B_2 \sin 2\theta_e + \ldots B_n \sin n\theta_e]$, where the symbols are the same as described above, which relationship for pole 10 is shown graphically on FIG. 2. While the fundamental curve is shown as an undistorted sine wave, it will be understood that, in reality, the curve will be distorted, due to harmonics, and it is this distortion that contributes to velocity modulations in brushless DC, stepping, and synchronous inductor motors and to reduced step and microstep accuracy in brushless DC and stepping motors. It has been found that, for the two-phase, four-pole-stator motor of FIG. 1, the harmonic that contributes most to the accuracy and velocity modulation problems discussed above is the fourth harmonic which is indicated on FIG. 2. The present invention eliminates or substantially reduces the fourth harmonic for this case, as described below.

The motor described in connection with FIG. 1 may be modified in accordance with the teaching of this invention by displacing the stator poles 12 and 13 from their normal position 180 degrees electrical from the other stator poles of the respective phases to eliminate one of the harmonics in the sum of both phases. Each of the stator poles 10, 11, 12, and 13, may be thought of as an independent contributor to the total motor torque with the torque contributed by each stator pole represented by $T_{10}$, $T_{11}$, $T_{12}$, and $T_{13}$, respectively. In simplified form, and considering only the fundamental and the fourth harmonic:

$$T_{10} = B_1 \sin \theta_e + B_4 \sin 4\theta_e$$

$$T_{11} = B_1 \sin (\theta_e + \pi/2) + B_4 \sin (4\theta_e + 2\pi)$$

$$T_{12} = B_1 \sin (\theta_e + \alpha) + B_4 \sin (4\theta_e + 4\alpha)$$

$$T_{13} = B_1 \sin (\theta_e + \pi/2 + \alpha) + B_4 \sin (4\theta_e + 2\pi + 4\alpha)$$

The torque created by phase 1 (stator poles 10 and 12) is given by $$T_{10} + T_{12} = B_1 \sin \theta_e + \sin (\theta_e + \alpha) + B_4 \sin (4\theta_e) + \sin (4\theta_e + 4\alpha),$$

which reduces mathematically to:

$$T_{10} + T_{12} = 2B_1 \cos(-\alpha/2) \sin(\theta + \alpha/2) + \ldots + 2B_4 \cos(-2\alpha) \sin(4\theta + 2\alpha).$$

By parity of reasoning, $T_{11} + T_{13}$ reduces to $T_{11} + T_{13} = 2B_1 \cos(-\alpha/2) \sin(\theta + \pi/2 + \alpha/2) + \ldots + 2B_4 \cos(-2\alpha) \sin(4\theta + 2\pi = 2\alpha)$, where $\alpha$ = displacement angle of stator poles 11 and 13, when $\alpha = 45$ degrees electrical, $\cos(-2\alpha) = 0$, and the entire $B_4$ term in both $T_{10} + T_{12}$ and $T_{11} + T_{13}$ reduces to zero, whereby $$T_{10} + T_{12} = 2 B_1 \cos(-\alpha/2) \sin(\theta + \alpha/2), \text{ and}$$

$$T_{11} + T_{13} = 2 B_1 \cos(-\alpha/2) \sin(\theta + \pi/2 + \alpha/2).$$

These are two periodic functions, displaced 90 degrees electrical from one another as is evidenced by the $\pi/2$ term in the argument of the sin in $T_{11} + T_{13}$. It is clear that the fourth harmonic term disappears because the $\cos(-2\alpha)$ is zero when $\alpha = 45$ degrees electrical.

Figure 3A:
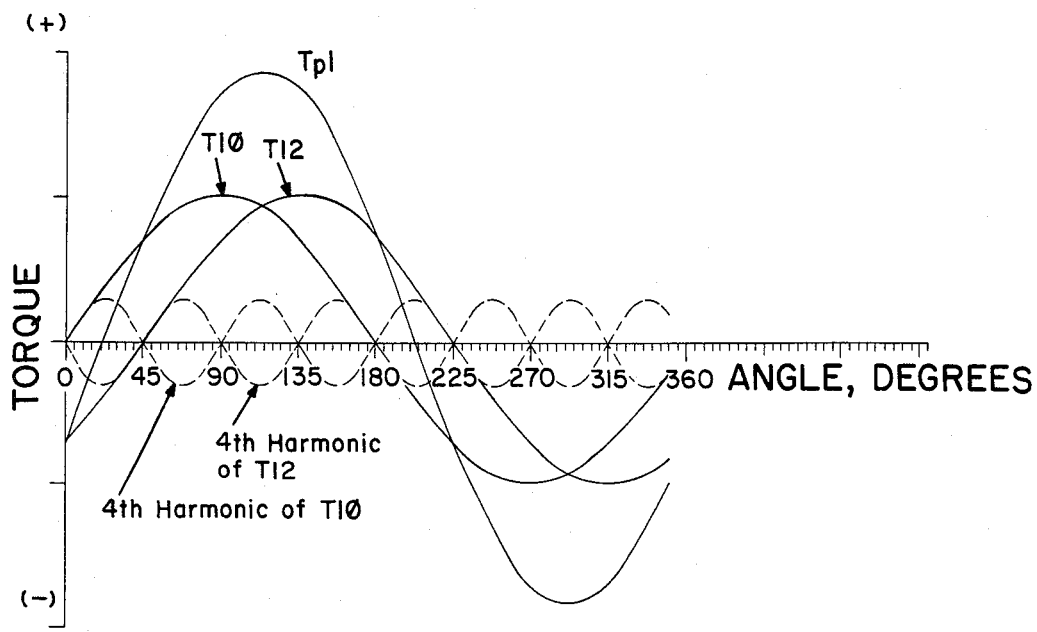
FIG. 3(a) shows the torque/angle curve for one phase of a two-phase motor constructed according to the present invention.
Figure 3B:
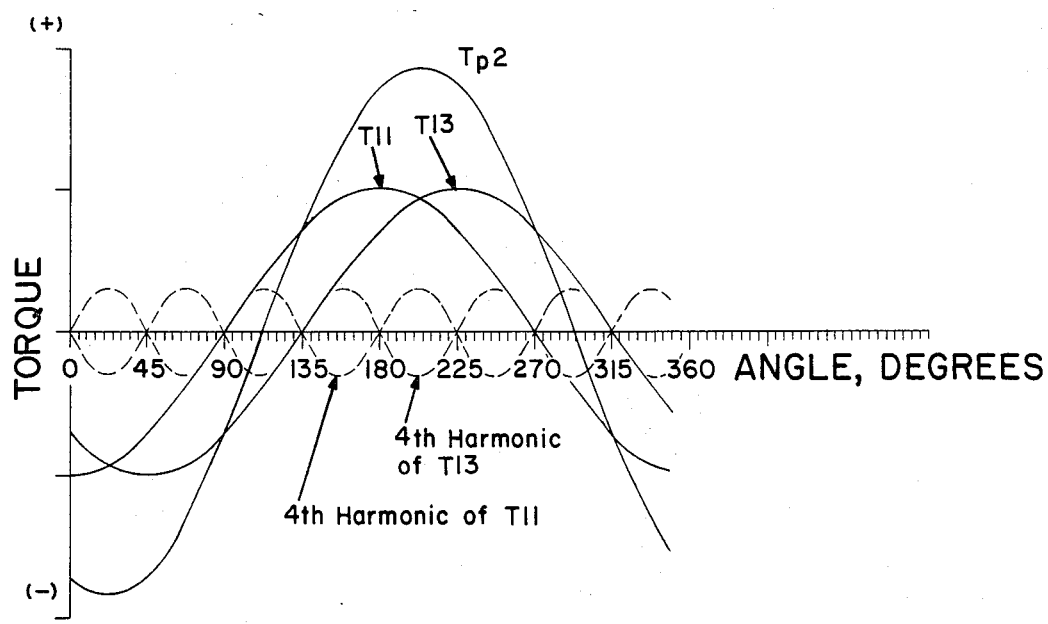
FIG. 3(b) shows a torque/angle curve as in FIG. 3(a), except for the opposite phase.

This is illustrated graphically in FIGS. 3(a) and 3(b). $T_{11}$ is 90 degrees electrical ahead of $T_{10}$, and $T_{13}$ is 90 degrees electrical ahead of $T_{12}$. $T_{12}$ leads $T_{10}$ by 45 degrees electrical, as $T_{13}$ leads $T_{11}$ by 45 degrees electrical. The fourth harmonics of $T_{10}$ and $T_{12}$ cancel, being 180 degrees electrical displaced, as do the fourth harmonics of $T_{11}$ and $T_{13}$.

FIG. 4 shows a physical rearrangement of the motor of FIG. 1 to achieve the curves shown in FIGS. 3(a) and 3(b), according to the present invention. (For greater clarity, the windings 15 and 16 shown in FIG. 1 are not shown in FIG. 4.) Here, the stator poles 12 and 13 have been shifted counterclockwise 45 degrees mechanical from their original positions (shown in broken lines). The stator poles 12 and 13 could as well have been shifted clockwise 45 degrees mechanical to produce the result shown on FIGS. 3(a) and 3(b); the two sets of curves will lead or lag each other, depending on the direction of shift of the stator poles and the direction of rotation of the rotor (not shown).

The necessary angle of displacement is determined by the relationship $\theta_e = 180°/h$, where h is the harmonic to be minimized, and therefore, the displacement angle is 45 degrees electrical. Electrical degrees and mechanical degrees are related by the expression $$\theta_e = (\theta m) \times (p),$$

where
$\theta_e$ = displacement in electrical degrees,
$\theta m$ = displacement in mechanical degrees, and
p = number of rotor pole pairs.

Thus, the mechanical displacement is also 45 degrees in the case illustrated by FIG. 4.

For simplicity, the present invention has been described as being applied to a two-phase motor having four stator poles and a single pair of rotor poles. While this arrangement would be operable, it would have the disadvantage of reduced peak permeance, since both stator poles of either phase could not be fully aligned with the rotor poles.

A more common arrangement for a "two-phase, four-pole" motor is one having eight stator poles and two pairs of rotor poles. FIG. 5 shows diagrammatically in cross section such an arrangement constructed according to the present invention. Here, stator poles 23, 24, 25, and 26 and a rotor 27 comprise one "motor" and 28, 29, 30, 31 and the rotor 27 comprise a second "motor".

The coils (not shown) on each such set of stator poles would be connected to provide an electrical phase. From the equations given above, the required mechanical displacement is 22½ degrees, as shown on FIG. 5, where stator poles 28, 29, 30, and 31 are displaced 22½ degrees mechanical from their conventional positions (shown in broken lines).

An alternative arrangement for an eight pole motor is shown on FIG. 6. Here, stator poles 32, 33, 34, and 35 and a rotor 36 magnetized as shown, comprise one "motor", and stator poles 37, 38, 39, and 40 and the rotor 36 comprise the other "motor", with the latter four stator poles being displaced 22½ degrees mechanical from their conventional positions (shown in broken lines).

As noted above for the motor of FIG. 4, the shifted poles could as well be shifted in the opposite direction to produce the same cancelling effect.

The present invention is not limited to providing minimization of the fourth harmonic. For example, in a three-phase motor, it is found that the sixth harmonic causes the accuracy and velocity modulation problems discussed above. Through the relationship $\theta_e = 180°/h$, it is seen that a displacement of 30 degrees electrical is required and such may be obtained as hereinbefore disclosed. Also, the present invention is not limited to the stator/rotor configurations chosen for illustration and it will be apparent to one skilled in the art that it can be applied, as well, to other stator/rotor configurations. Furthermore, it will be understood that the invention disclosed is not limited to those cases where it is desired to minimize the problems with velocity modulation and accuracy discussed above, but also to any case where it is desired to minimize a given harmonic of the fundamental torque/angle curve.

It will be understood that what has been disclosed in a novel method for minimizing a given harmonic of the fundamental torque/angle curve which is particularly useful in minimizing the harmonics which contribute to the problems of velocity modulation in brushless D.C., stepping, and synchronous motors and reduced step and microstep accuracy in brushless D.C. and stepping motors.

Since certain changes may be made in carrying out the above invention without departing from the scope thereof, it is intended that all matter contained in the above description or shown in the accompanying Drawing shall be interpreted as illustrative and not in a limiting sense.

It is also intended that the following claims are intended to cover all of the generic and specific features of the invention herein described, and all statements of the scope of the invention which, as a matter of language, might be said to fall therebetween.

We claim:

1. An electric motor, comprising:
  (a) a rotor having a pair of N-S magnetic poles radially displaced symmetrically thereon; and
  (b) first and second sets of stator poles radially disposed about the rotor, each set of stator poles being energized by the passage of electric current through coils wound upon the poles to provide flux linkage with the rotor poles, with successive energization and de-energization of the stator poles causing rotation of the rotor, with the stator poles of the first set disposed in the positions they would occupy if all the stator poles were radially disposed symmetrically about the rotor, and with the stator poles of the second set disposed in positions displaced by a given mechanical angle of displacement, equal to 180° divided by the product of the number of a harmonic of the fundamental torque/angle curve times the number of rotor pole pairs, from the positions they would occupy if all the stator poles were radially disposed symmetrically about the rotor, whereby the displacement causes the harmonic to be attenuated.

2. An electric motor, comprising:
  (a) a rotor having two pairs of N-S magnetic poles radially displaced symmetrically thereon; and
  (b) first, second, third, fourth, fifth, sixth, seventh, and eighth stator poles radially disposed about the rotor, with the first pole lying on an axis passing through the center of the rotor and parallel to a cylindrical cross section of the rotor, with the second, third, fourth, fifth, sixth, seventh, and eighth stator poles displaced from the first stator pole by 45, 90, 135, 157½, 202½, 247½, and 292½ degrees mechanical, respectively, whereby the displacement causes the fourth harmonic of the fundamental torque/angle curve to be attenuated.

3. An electric motor, comprising:
  (a) a rotor having two pairs of N-S magnetic poles radially displaced symmetrically thereon; and
  (b) first, second, third, fourth, fifth, sixth, seventh, and eighth stator poles radially disposed about the rotor, with the first pole lying on an axis passing through the center of the rotor and parallel to a cylindrical cross section of the rotor, with the second, third, fourth, fifth, sixth, seventh, and eighth stator poles displaced from the first stator pole by 45, 90, 135, 202½, 247½, 292½, and 337½ degrees mechanical, respectively, whereby the displacement causes the fourth harmonic of the fundamental torque/angle curve to be attenuated.

4. An electric motor, comprising:
  (a) a rotor having two pairs of N-S magnetic poles radially displaced symmetrically thereon; and
  (b) first, second, third, fourth, fifth, sixth, seventh, and eighth stator poles radially disposed about the rotor, with the first pole lying on an axis passing through the center of the rotor and parallel to a cylindrical cross section of the rotor, with the second, third, fourth, fifth, sixth, seventh, and eighth stator poles displaced from the first stator pole by 45, 67½, 112½, 180, 225, 247½, and 292½ degrees mechanical, respectively, whereby the displacement causes the fourth harmonic of the fundamental torque/angle curve to be attenuated.

5. An electric motor, comprising:
  (a) a rotor having two pairs of N-S magnetic poles radially displaced symmetrically thereon; and
  (b) first, second, third, fourth, fifth, sixth, seventh, and eighth stator poles radially disposed about the rotor, with the first pole lying on an axis passing through the center of the rotor and parallel to a cylindrical cross section of the rotor, with the second, third, fourth, fifth, sixth, seventh, and eighth stator poles displaced from the first stator pole by 45, 112½, 157½, 180, 225, 292½, and 237½ degrees mechanical, respectively, whereby the displacement causes the fourth harmonic of the fundamental torque/angle curve to be attenuated.

* * * * *